United States Patent
Naito

[11] Patent Number: 6,115,235
[45] Date of Patent: Sep. 5, 2000

[54] CAPACITOR

[75] Inventor: Kazumi Naito, Chiba, Japan

[73] Assignee: Showa Denko Kabushiki Kaisha, Tokyo, Japan

[21] Appl. No.: 09/171,902

[22] PCT Filed: Feb. 27, 1998

[86] PCT No.: PCT/JP98/00823

§ 371 Date: Oct. 28, 1998

§ 102(e) Date: Oct. 28, 1998

[87] PCT Pub. No.: WO98/38660

PCT Pub. Date: Sep. 3, 1998

[30] Foreign Application Priority Data

Feb. 28, 1997 [JP] Japan .................................. 9-045650

[51] Int. Cl.[7] .............................. H01G 4/005; H01G 9/04
[52] U.S. Cl. ........................ 361/303; 361/305; 361/508; 361/528
[58] Field of Search ..................... 361/303, 305, 361/306.3, 311–313, 321.1–321.5, 322, 508–509, 528–529; 257/306, 308, 300, 303, 309, 307, 296, 532; 438/253, 397, 396, 254, 244

[56] References Cited

U.S. PATENT DOCUMENTS

| | | |
|---|---|---|
| 4,084,965 | 4/1978 | Fry . |
| 4,190,854 | 2/1980 | Redfern .................... 257/532 |
| 4,536,414 | 8/1985 | Kroger et al. ................ 427/534 |
| 4,954,169 | 9/1990 | Behrens . |
| 5,837,630 | 11/1998 | Owens et al. .................. 501/80 |
| 5,939,746 | 8/1999 | Koyama et al. ................ 257/306 |

FOREIGN PATENT DOCUMENTS

| | | |
|---|---|---|
| 60-121207 | 6/1985 | Japan . |
| 1 219 748 | 1/1971 | United Kingdom . |
| 98/19811 | 5/1998 | WIPO . |

OTHER PUBLICATIONS

"Reactions During Sintering of Niobium Powder from Aluminothermic Reduction Product," R&HM, Dec. 1985, vol. 4, p. 189–194.

"The Influence of Gas Atmospheres on the First-Stage Sintering of High-Purity Niobium Powders," Metallurigical Transactions, Jun. 1984, vol. 15A, p. 1111–1116.

Primary Examiner—Kristine Kincaid
Assistant Examiner—Anthony Dinkins
Attorney, Agent, or Firm—Sughrue, Mion, Zinn, Macpeak & Seas, PLLC

[57] ABSTRACT

In a capacitor comprising a pair of electrodes and a dielectric substance intervening between the two electrodes, one of the electrodes is composed of sintered niobium nitride. Preferably, the dielectric substance is composed of niobium oxide and the electrode other than the electrode composed of sintered niobium nitride is composed of an ingredient selected from electrolytes, organic semiconductors and inorganic semiconductors. This capacitor has good environmental stability and good leak current characteristics.

7 Claims, 1 Drawing Sheet

CAPACITOR

TECHNICAL FIELD

This invention relates to a novel capacitor. More particularly, it relates to a capacitor which is inexpensive and exhibits good leak current characteristics, and a capacitor which has a large capacitance, especially a large capacitance per unit weight at a high frequency, and exhibits good leak characteristics.

BACKGROUND ART

As an electrode of a capacitor made of a sintered metal, those which are composed of sintered aluminum, tantalum and alloys thereof are known. These capacitors have widely used in various fields. For example, for a capacitor used in a smoothing circuit for obtaining a direct current from an alternating current, it is desired that the capacitor possesses a low impedance and a large capacitance at a high frequency for suppressing the occurrence of spike-shaped voltage and enhancing the efficiency of conversion to a direct current.

The above-mentioned sintered metals used as a capacitor electrode have problems. Namely, sintered aluminum has poor environmental characteristics such as moisture resistance and chemical characteristics, and sintered tantalum is expensive. Sintered niobium is also known as a material used for a capacitor electrode, and not possessing the problems encountered with sintered aluminum and tantalum, but, it has another problem that oxygen adsorbed on its surface influences dielectrics as mentioned below, and thus, the leak current characteristics are not satisfactory and it is of poor practical use.

To provide a capacitor used in a smoothing circuit and having an enhanced capacitance at a high frequency, the volume of a sintered metal substrate made of, for example, tantalum or aluminum, should be increased. The increase in volume of the sintered metal substrate is inconsistent with a requirement of miniaturization of a capacitor. Among others, tantalum gives a relatively satisfactory for the requirements of an enhanced capacitance at a high frequency and a miniaturization of a capacitor, but, it is still not completely satisfactory for these requirements. Usually a tantalum oxide is used as a dielectric substance for a capacitor with an electrode composed of sintered tantalum bodies. However, if a material having a dielectric constant larger than that of tantalum oxide is used as a dielectric substance, the capacitor can be more miniaturized. As examples of the material having a large dielectric constant, there can be mentioned titanium oxide and niobium oxide. But, these materials exhibit poor leak current (hereinafter abbreviated to "LC") characteristics.

DISCLOSURE OF INVENTION

The inventors have found, first, that sintered bodies of niobium nitride are advantageous in that the amount of oxygen deposited on the surface thereof is minor and the leak current characteristics of the capacitor are satisfactory, and secondly, that the above-mentioned problem as for LC characteristics of a capacitor with niobium oxide dielectrics is due to the fact that oxygen deposited on the surface of sintered bodies influences the dielectric substance. Based on these findings, the inventors have completed the present invention.

The inventors have further found that, if the electrode other than the electrode composed of sintered niobium nitride bodies is made of at least one compound selected from organic semiconductors and inorganic semiconductors, which do not have a capability of supplying oxygen to an undue extent, a capacitor having a large capacitance at a high frequency can be obtained. Further, if, as the organic semiconductor or the inorganic semiconductor, those which have an electrical conductivity of $10^{-2}$ S·cm$^{-1}$ to $10^3$ S·cm$^{-1}$ are used, a capacitor having a more reduced impedance can be obtained.

Thus, in accordance with the present invention, there is provided a capacitor comprising a pair of electrodes and a dielectric substance intervening between the electrodes, characterized in that one of the electrodes is composed of sintered niobium nitride.

The dielectric substance of the above-mentioned capacitor is preferably made of niobium oxide, more preferably made of niobium oxide prepared by electrolytic oxidation of the sintered niobium nitride. The other of the two electrodes is preferably made of at least one ingredient selected from electrolytes, organic semiconductors and inorganic semiconductors, more preferably at least one ingredient selected from organic semiconductors and inorganic conductors, which have an electrical conductivity of from $10^{-2}$ S·cm$^{-1}$ to $10^3$ S·cm$^{-1}$.

BEST MODE FOR CARRYING OUT THE INVENTION

Figure 1:
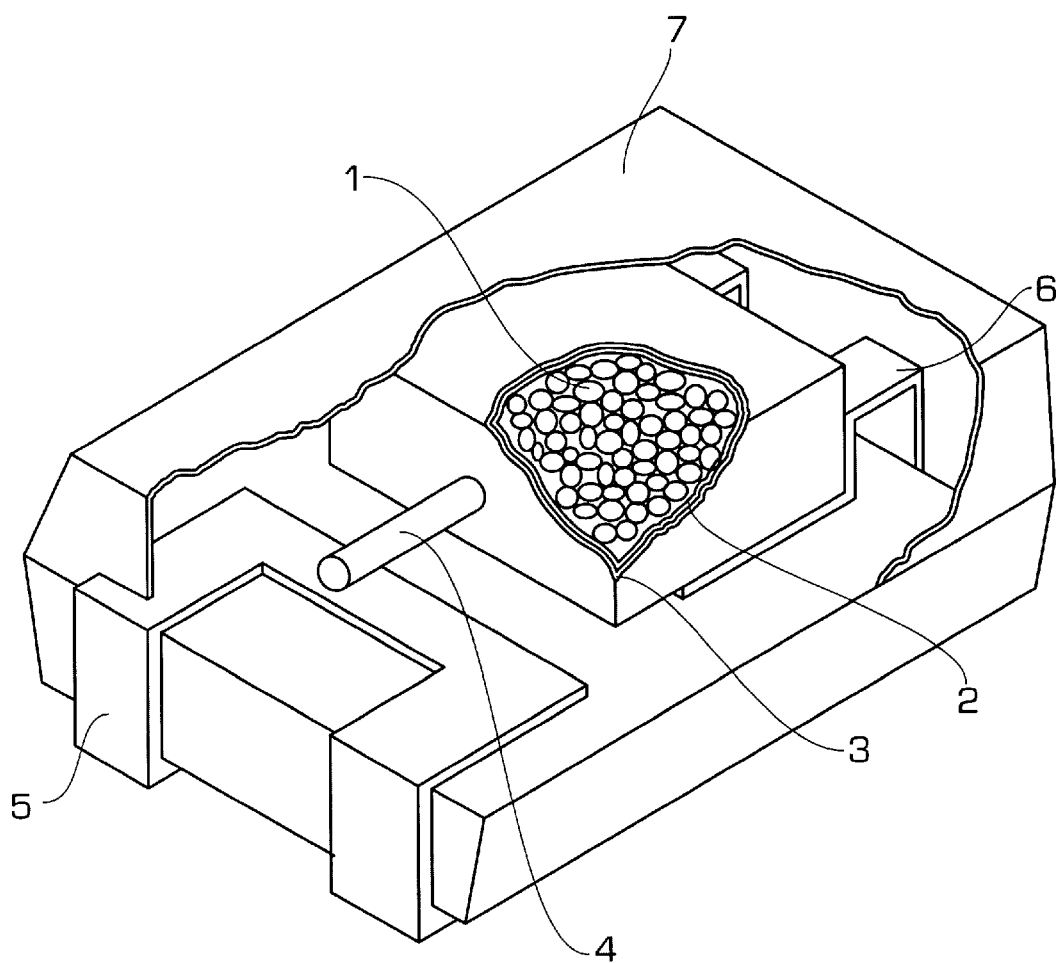
FIG. 1 is a partially cutaway view in perspective specifically illustrating one example of the capacitor of the present invention.

The niobium nitride constituting one of the electrodes in the capacitor of the invention is made by partially nitrifying metallic niobium. For example, niobium nitride of a powdery form is made by nitrifying the surfaces of particles of powdery niobium in a nitrogen gas atmosphere. In this instance, the amount of nitrogen bound to the niobium is in the range of from 10 to 200,000 ppm by weight, preferably 100 to 50,000 ppm by weight. For nitrifying niobium into niobium nitride having the desired nitrogen content, the temperature employed is not higher than 2,000° C. and the time employed is in several tens of hours. Generally, as the temperature for nitrification becomes high, the particle surfaces of powdery niobium are nitrified in a shorter time. Even at room temperature, when powdery niobium is fluidized for several tens of hours, powdery niobium nitride containing several hundreds ppm of nitrogen is obtained.

The thus-obtained powdery niobium nitride has a shape approximately similar to that of the powdery niobium used as the raw material. In one example, if a powdery niobium mass obtained by pulverizing a niobium lump is used as a raw material, powdery niobium nitride having various shapes which are peculiar to pulverized mass is obtained. In another example, if powdery niobium in the form of a secondary particle is used, which is prepared by reducing potassium fluoroniobate to give a finely divided particles, and granulating the finely divided particles into secondary particles, then, powdery niobium nitride similar to the secondary particles is obtained. Further, for example, if powdery niobium having an average particle diameter of from 0.5 μm to 100 μm is used, powdery niobium nitride having a similar average particle diameter is obtained.

The sintered niobium nitride is obtained by sintering, for example, powdery niobium nitride at a high temperature in vacuo. In one example, powdery niobium nitride is press-molded and then the molded product is allowed to stand at a temperature of 1,000 to 2,000° C. and a pressure of $10^{-1}$ to $10^{-6}$ Torr for several minutes to several hours to give a sintered niobium nitride. If the degree of vacuum is insufficient at sintering, air is entrapped in the powdery material during sintering, oxidation occurs simultaneously with nitrification with the result that the capacitor with the niobium nitride electrode has a poor performance. Generally a suitable sintering temperature varies depending upon the particle diameter of the powdery niobium nitride, and, the smaller the particle diameter, the lower the sintering temperature.

As the dielectric substance used in the capacitor of the invention, there can be mentioned, for example, tantalum oxide, niobium oxide, polymeric substances and ceramic compounds. When tantalum oxide is used as a dielectric substance, the tantalum oxide can be prepared by depositing a tantalum-containing complex such as, for example, an alkoxy complex or an acetylacetonato complex on an electrode, and then, subjecting the deposit to hydrolysis and/or pyrolysis. When niobium oxide is used as a dielectric substance, the niobium oxide can be prepared by chemically converting a niobium nitride electrode into niobium oxide in an electrolyte, or by depositing a niobium-containing complex such as, for example, an alkoxy complex or an acetylacetonato complex on an electrode, and then, subjecting the deposit to hydrolysis and/or pyrolysis. Thus, a niobium oxide dielectrics can be formed on the surface of niobium nitride electrode by converting a niobium nitride electrode into niobium oxide in an electrolyte or subjecting a niobium-containing complex on a niobium nitride electrode to hydrolysis and/or pyrolysis. The conversion of niobium nitride into niobium oxide in an electrolyte can be effected usually by using an aqueous protonic acid, for example, an aqueous 0.1% phosphoric acid solution or sulfuric acid solution. In the case where niobium nitride is formed into the niobium dielectrics in an electrolyte, the capacitor of the invention is an electrolytic capacitor with a positive electrode composed of niobium nitride. In the case where a niobium-containing complex is subjected to hydrolysis and/or pyrolysis to yield niobium oxide, the niobium nitride has theoretically no polarity and can be used either as a positive electrode or a negative electrode.

The polymeric substance dielectrics can be prepared by, as described in Japanese Unexamined Patent Publication No. H7-63045, a process wherein a gaseous or liquid monomer is introduced in voids or pores within metal, followed by polymerization; a process wherein a solution of a polymeric substance in a suitable solvent is introduced; and a process wherein a molten polymeric substance is introduced. As specific examples of the high polymeric substances, there can be mentioned a fluororesin, an alkyd resin, an acrylic resin, a polyester resin such as polyethylene terephthalate, a vinyl resin, a xylylene resin and a phenol resin.

The dielectric substance composed of a ceramic compound can be prepared by a process for producing a compound with perovskite structure on a surface of metal having voids or pores, as described in Japanese Unexamined Patent Publication No. H7-85461. As specific examples of the compound with peroviskite structure, there can be mentioned $BaTiO_3$, $SrTiO_3$, $MgTiO_3$ and $BaSnO_3$.

The electrode other than the niobium nitride electrode of the capacitor of the invention is not particularly limited, and can be composed of at least one ingredient selected from electrolytes well known in an aluminum electrolytic capacitor industry, organic semiconductors and inorganic semiconductors. As specific examples of the electrolytes, there can be mentioned a mixed dimethylformamide/ethylene glycol liquid containing 5% by weight of isobutyltripropylammonium borontetrafluoride, and a mixed propylene carbonate/ethylene glycol liquid containing 7% by weight of tetraethylammonium borontetrafluoride. As examples of the organic semiconductors, there can be mentioned an organic semiconductor composed of benzopyroline tetramer and chloranil, an organic semiconductor predominantly comprised of tetrathiotetracene, an organic semiconductor predominantly comprised of tetracyano-quinodimethane, and organic semiconductors predominantly comprised of electrically conductive polymers represented by the following formula (1) or (2), which are doped with a dopant.

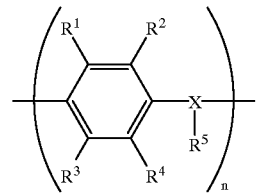

(1)

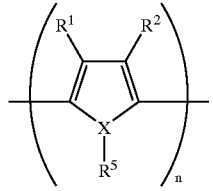

(2)

wherein $R^1$, $R^2$, $R^3$ and $R^4$ independently represents hydrogen, an alkyl group having 1 to 6 carbon atoms or an alkoxy group having 1 to 6 carbon atoms, X represents an oxygen, sulfur or nitrogen atom, $R^5$ represents only when X is a nitrogen atom, and represents hydrogen or an alkyl group having 1 to 6 carbon atoms, $R^1$ and $R^2$ may form together a ring, and $R^3$ and $R^4$ also may form together a ring. As specific examples of the electrically conductive polymers of formulae (1) and (2), there can be mentioned polyaniline, polyoxyphenylene, polyphenylene sulfide, polythiophene, polyfuran, polypyrrole and polymethylpyrrole. As examples of the inorganic semiconductors, there can be mentioned inorganic semiconductors predominantly comprised of lead dioxide or manganese dioxide, and inorganic semiconductors composed of triiron tetraoxide. These semiconductors may be used either alone or as a mixture of at least two thereof.

When organic semiconductors and inorganic semiconductors having an electrical conductivity of $10^{-2}$ S·cm$^{-1}$ to $10^3$ S·cm$^{-1}$ are used as the organic semiconductors and inorganic conductors, capacitors having a far reduced impedance and a more enhanced capacitance at a high frequency are obtained.

The structure of the capacitor of the invention may be those which have heretofore been employed, provided that the capacitor comprises a pair of electrodes and a dielectric intervening between the electrodes. One specific example of the capacitor of the invention is illustrated in FIG. 1, wherein a sintered niobium nitride 1 composed of a plurality of sintered niobium nitride bodies is placed as an electrode and on which niobium oxide dielectric layers have been formed by chemically converting the surfaces of the sintered niobium nitride bodies into niobium oxide in an electrolyte, or by subjecting a niobium-containing complex to hydrolysis and/or pyrolysis to produce niobium oxide on the surfaces of the sintered niobium nitride bodies. The other electrode is formed on the dielectric layer.

Further, a carbon paste 2 and a silver paste 3 are formed in this order on the other electrode, and then, the thus-prepared laminated product is encapsulated with a sealing material such as epoxy resin to form a capacitor. The capacitor is provided with a niobium lead 4 which has been sintered in integrated with the sintered niobium nitride bodies or which has been welded to the niobium nitride sintered bodies. The capacitor is assembled together with a positive electrode lead 5 and a negative electrode lead 6 and the assembly is enclosed by an outer resin covering 7.

The capacitor provided with the niobium lead 4, illustrated in FIG. 1, is a rectangular parallelopiped, but, its shape is not particularly limited thereto and may be, for example, cylindrical.

The capacitor of the invention will now be described specifically by the following examples.

EXAMPLES 1 TO 7

Powdery niobium having an average particle diameter of 10 to 40 μm was treated at 400° C. in a nitrogen atmosphere to give powdery niobium nitride. The amount of nitrogen bound to niobium by nitrification was about 2,000 ppm by weight. The powdery niobium nitride was sintered at 1,500° C. in vacuo to give sintered niobium nitride bodies having a diameter of 10 mm and a thickness of about 1 mm, and containing pores having an average diameter of 3 μm with a porosity of 45%. The sintered niobium nitride bodies were treated in an aqueous phosphoric acid solution at a voltage of 20 V to form a niobium oxide dielectric layer on the surface of each sintered body.

Each of the substances for forming an electrode other than the electrode composed of the sintered niobium nitride bodies, as shown in Table 1, was deposited on a plurality of the dielectric layer-formed sintered niobium nitride bodies. Further, a carbon paste and then a silver paste were laminated in this order on the dielectric layer-formed sintered niobium nitride bodies. Then the thus-laminated product was encapsulated with an epoxy resin to give a capacitor.

The capacitance at 100 kHz and the LC value at 4 V were measured. The results are shown in Table 2.

TABLE 1

| Example No. | Other electrode and electrical conductivity (S · cm$^{-1}$) | Electrode forming method |
|---|---|---|
| Example 1 | Chloranil complex of tetrathiotetracene 2 × 10$^0$ | Repeat of immersion in solution of the compound described in the left column, and drying |
| Example 2 | Isoquinoline complex of tetracyanoquinodimethane 3 × 10$^0$ | Repeat of immersion in solution of the compound described in the left column, and drying |
| Example 3 | Dope of polyaniline in toluenesulfonic acid 3 × 10$^1$ | Repeat of oxidation reaction in aniline solution |
| Example 4 | Dope of polypyrrole in toluenesulfonic acid 5 × 10$^1$ | Repeat of oxidation reaction in pyrrole solution |
| Example 5 | Dope of polythiophene in toluenesulfonic acid 4 × 10$^1$ | Repeat of oxidation reaction in thiophene solution |
| Example 6 | Mixture of lead dioxide and lead sulfate (lead dioxide 97 wt %) 5 × 10$^1$ | Repeat of oxidation reaction of lead acetate solution |
| Example 7 | Mixture of manganese dioxide and lead dioxide (lead dioxide 95 wt %) | Thermal decomposition of manganese nitrate (250° C. twice), then repeat of |

TABLE 1-continued

| Example No. | Other electrode and electrical conductivity (S · cm$^{-1}$) | Electrode forming method |
|---|---|---|
| | 5 × 10$^1$ | oxidation reaction of lead acetate solution |

EXAMPLES 8 AND 9

Powdery niobium nitride having an average particle diameter of 40 to 80 μm and a bound nitrogen content of about 10,000 ppm by weight was sintered at 1,600° C. in vacuo to give sintered niobium nitride bodies having a diameter of 10 mm and a thickness of 1 mm, and containing pores having an average diameter of 7 μm with a porosity of 55%. The sintered niobium nitride bodies were immersed in a bath of pentaethyl niobate liquid, and thereafter, the sintered niobium nitride bodies taken out from the bath were maintained at 85° C. in a steam and then dried at 350° C. whereby a dielectric layer composed of niobium oxide was formed on the sintered niobium nitride bodies.

Each of chloranil complex of tetrathiotetracene (Example 8) and a mixture of lead acetate and lead sulfate (Example 9) for forming an electrode other than the electrode composed of the sintered niobium nitride bodies was deposited on a plurality of the dielectric layer-formed sintered niobium nitride bodies by the same procedures employed in Example 1 and Example 6, respectively. Further, a carbon paste and then a silver paste were laminated in this order on the dielectric layer-formed sintered niobium nitride bodies. Then the laminated product was encapsulated with an epoxy resin to give a capacitor. The properties of the capacitor were evaluated. The results are shown in Table 2.

Comparative Examples 1 and 2

Powdery tantalum having an average particle diameter of 10 to 40 μm was sintered at 1,500° C. in vacuo to give sintered tantalum bodies having a diameter of 10 mm and a thickness of about 1 mm, and containing pores having an average diameter of 3 μm with a porosity of 45%. The sintered tantalum bodies were treated in an aqueous phosphoric acid solution at a voltage of 20 V to form a tantalum oxide dielectric layer on the surface of each sintered body.

Each of chloranil complex of tetrathiotetracene (Comparative Example 1) and a mixture of lead acetate and lead sulfate (Comparative Example 2) for forming an electrode other than the electrode composed of the sintered tantalum bodies was deposited on a plurality of the dielectric layer-formed sintered tantalum bodies by the same procedures employed in Example 1 and Example 6, respectively. Further, a carbon paste and then a silver paste were laminated in this order on the dielectric layer-formed sintered tantalum bodies, and then, the thus-laminated product was encapsulated with an epoxy resin by the same procedures as employed in the above-mentioned Examples to give a capacitor. The properties of the capacitor were evaluated. The results are shown in Table 2.

Comparative Examples 3 and 4

The procedures employed in Example 1 and Example 6 were repeated wherein the powdery niobium was not nitrified and was sintered to give sintered niobium bodies, and capacitors were made from the sintered niobium bodies. The properties of the capacitors were evaluated. The results are shown in Table 2.

TABLE 2

|  | Capacitance (100 kHz) μF | LC (4 V) μA |
| --- | --- | --- |
| Example 1 | 55 | 0.9 |
| Example 2 | 50 | 0.8 |
| Example 3 | 60 | 1.2 |
| Example 4 | 60 | 1.0 |
| Example 5 | 55 | 1.2 |
| Example 6 | 62 | 0.8 |
| Example 7 | 60 | 1.0 |
| Example 8 | 40 | 0.3 |
| Example 9 | 40 | 0.3 |
| Comparative Example 1 | 24 | 0.02 |
| Comparative Example 2 | 26 | 0.04 |
| Comparative Example 3 | 54 | 14 |
| Comparative Example 4 | 57 | 18 |

EXAMPLE 10

The same sintered niobium nitride bodies as prepared in Example 1 were immersed in a bath of pentaethyl tantalate liquid, and thereafter, the sintered niobium nitride bodies taken out from the bath were maintained at 85° C. in a steam and then dried at 450° C. whereby a dielectric layer composed of tantalum oxide was formed on the sintered niobium nitride bodies.

Then an electrolyte composed of a 5% solution of isobutyltripropylammonium borontetrafluoride electrolyte in a mixed liquid of dimethylformamide and ethylene glycol, was applied onto the sintered niobium nitride bodies. The electrolyte-applied sintered niobium nitride bodies were charged in a can, and the can was sealed to give a capacitor.

The properties of the capacitor were evaluated. The results are shown in Table 3.

Comparative Example 5

The procedures employed in Example 10 were repeated to make a capacitor wherein sintered niobium bodies were used instead of the sintered niobium nitride bodies with all other conditions remaining the same. The properties of the capacitor were evaluated. The results are shown in Table 3.

EXAMPLE 11

By the same procedures as employed in Example 1, sintered niobium nitride bodies were made and then niobium oxide dielectric layers were formed on the sintered niobium nitride bodies. An electrolyte was applied to the dielectric layer-formed sintered niobium nitride bodies, and the electrolyte-applied product was charged in a can and the can was sealed to give a capacitor by the same procedures as described in Example 10. The properties of the capacitor were evaluated. The results are shown in Table 3.

Comparative Example 6

The procedures as employed in Example 11 were repeated to make a capacitor wherein sintered niobium bodies were used instead of the sintered niobium nitride bodies with all other conditions remaining the same. The properties of the capacitor were evaluated. The results are shown in Table 3.

TABLE 3

|  | LC (4 V) μA |
| --- | --- |
| Example 10 | 0.3 |
| Example 11 | 0.4 |
| Comparative Example 5 | 9 |
| Comparative Example 6 | 10 |

EXAMPLE 12

By the same procedures as employed in Example 1, sintered niobium nitride bodies were made and then niobium oxide dielectric layers were formed on the sintered niobium nitride bodies. The dielectric layer-formed sintered niobium nitride bodies were immersed in an aqueous equimolar solution containing 0.01 mole/l of iron(II) sulfate and iron (III) sulfate, and then, an excessive amount of an aqueous sodium hydroxide solution was added whereby triiron tetraoxide as the electrode other than the niobium nitride electrode was formed on the dielectric layer-formed sintered niobium nitride bodies. A carbon paste and then a silver paste were laminated in this order on the dielectric layer-formed sintered niobium nitride bodies, and then, the thus-laminated product was encapsulated with an epoxy resin by the same procedures as employed in the above-mentioned Examples to give a capacitor. The triiron tetraoxide used had an electrical conductivity of $10^{-3}$ S·cm$^{-1}$. The properties of the capacitor were evaluated. The results are shown in Table 4.

Comparative Example 7

The procedures as employed in Example 12 were repeated to make a capacitor wherein sintered niobium bodies were used instead of the sintered niobium nitride bodies with all other conditions remaining the same. The properties of the capacitor were evaluated. The results are shown in Table 4.

TABLE 4

|  | Capacitance (100 kHz) μF | LC (4 V) μA |
| --- | --- | --- |
| Example 12 | 38 | 0.7 |
| Comparative Example 7 | 38 | 16 |

Industrial Applicability

The capacitor of the invention with an electrode composed of sintered niobium nitride bodies exhibits excellent environmental stability and leak current (LC) characteristics.

Especially the capacitor having an electrode composed of sintered niobium nitride bodies and the other electrode composed of at least one ingredient selected from organic semiconductors and inorganic semiconductors, and having a niobium oxide dielectric intervening between the two electrodes has an enhanced capacitance per unit weight at a high frequency as well as excellent leak current (LC) characteristics. Therefore, the capacitor of the invention is suitable for a smoothing circuit of a power source.

What is claimed is:

1. A capacitor comprising a pair of electrodes and a dielectric substance intervening between the electrodes, wherein one of the electrodes is composed of sintered niobium nitride.

2. The capacitor according to claim 1, wherein a content of bound nitrogen in said sintered niobium nitride is in the range of 10 to 200,000 ppm by weight.

3. The capacitor according to claim 1, wherein the dielectric substance is composed of niobium oxide.

4. The capacitor according to claim 3, wherein the dielectric substance composed of niobium oxide is formed on the electrode composed of said sintered niobium by conversion-treating the electrode composed of said sintered niobium nitride in an electrolyte.

5. The capacitor according to any of claims 1 to 4, wherein the electrode other than the electrode composed of said sintered niobium nitride is at least one ingredient selected from the group consisting of electrolytes, organic semiconductors and inorganic semiconductors.

6. The capacitor according to any of claims 1 to 4, wherein the electrode other than the electrode composed of said sintered niobium nitride is at least one ingredient selected from the group consisting of organic semiconductors and inorganic semiconductors, which have an electrical conductivity of $10^{-2}$ S·cm$^{-1}$ to $10^{3}$ S·cm$^{-1}$.

7. The capacitor according to claim 3, wherein the dielectric substance composed of niobium oxide is formed on the electrode composed of said sintered niobium nitride by subjecting a niobium-containing complex to at least one of hydrolysis and pyrolysis on the electrode composed of said sintered niobium nitride.

* * * * *

UNITED STATES PATENT AND TRADEMARK OFFICE
CERTIFICATE OF CORRECTION

PATENT NO. : 6,115,235
DATED : September 5, 2000
INVENTOR(S) : Kazumi, Naito

It is certified that error appears in the above-identified patent and that said Letters Patent is hereby corrected as shown below:

Column 9,
Line 5, in place of "said sintered niobium" please substitute "said sintered niobium nitride."

Signed and Sealed this

Fourteenth Day of August, 2001

*Attest:*

*Attesting Officer*

NICHOLAS P. GODICI
*Acting Director of the United States Patent and Trademark Office*